US009675982B2

(12) United States Patent
Becker et al.

(10) Patent No.: US 9,675,982 B2
(45) Date of Patent: Jun. 13, 2017

(54) SPRAY TIP AND METHOD OF MANUFACTURE

(71) Applicant: Graco Minnesota Inc., Minneapolis, MN (US)

(72) Inventors: Steven Dale Becker, Blaine, MN (US); Diane Leigh Olson, Elk River, MN (US); Craig Joseph Wojciechowski, Foley, MN (US); David John Thompson, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/362,047

(22) Filed: Nov. 28, 2016

(65) Prior Publication Data

US 2017/0072410 A1    Mar. 16, 2017

Related U.S. Application Data

(63) Continuation of application No. 15/022,044, filed as application No. PCT/US2014/055804 on Sep. 16, 2014.

(Continued)

(51) Int. Cl.
*B05B 15/02* (2006.01)
*B05B 1/02* (2006.01)
(Continued)

(52) U.S. Cl.
CPC .............. *B05B 1/02* (2013.01); *B05B 1/341* (2013.01); *B05B 9/01* (2013.01); *B05B 9/08* (2013.01);
(Continued)

(58) Field of Classification Search
CPC ... B05B 15/001; B05B 15/0283; B05B 1/267; B05B 15/02; B05B 9/01; B05B 9/08
(Continued)

(56) References Cited

U.S. PATENT DOCUMENTS 3,000,576 A    9/1961 Levey et al.
3,633,828 A    1/1972 Larson
(Continued)

FOREIGN PATENT DOCUMENTS

JP    05-337405 A    12/1993
JP    2002-522206 A    7/2002

OTHER PUBLICATIONS

International Search Report and Written Opinion for PCT Application No. PCT/US2014/055804, dated Dec. 11, 2014, 13 pages.
(Continued)

*Primary Examiner* — Alexander Valvis
(74) *Attorney, Agent, or Firm* — Kinney & Lange, P.A.

(57) ABSTRACT

A spray tip comprises a tip body, a tip piece, and a pre-orifice piece. The tip body has a fluid channel along a channel axis ($A_C$). The tip piece is disposed within the fluid channel, and has a stepped, narrowing passage that terminates in an outlet orifice. The pre-orifice piece has an inlet passage, and is disposed within the fluid channel, abutting and immediately upstream of the tip piece. The pre-orifice piece and the tip piece together define a turbulating chamber therebetween.

17 Claims, 5 Drawing Sheets

Related U.S. Application Data

(60) Provisional application No. 61/878,191, filed on Sep. 16, 2013, provisional application No. 61/929,403, filed on Jan. 20, 2014, provisional application No. 61/987,654, filed on May 2, 2014.

(51) Int. Cl.
| | |
|---|---|
| *B05B 15/00* | (2006.01) |
| *B05B 1/34* | (2006.01) |
| *B05B 9/01* | (2006.01) |
| *B05B 9/08* | (2006.01) |
| *B28B 1/48* | (2006.01) |
| *B29C 45/14* | (2006.01) |
| *B29L 9/00* | (2006.01) |
| *B29L 23/00* | (2006.01) |

(52) U.S. Cl.
CPC .......... *B05B 9/0838* (2013.01); *B05B 9/0861* (2013.01); *B05B 15/001* (2013.01); *B05B 15/0283* (2013.01); *B28B 1/48* (2013.01); *B29C 45/14065* (2013.01); *B29C 45/14598* (2013.01); *B29C 2045/14098* (2013.01); *B29C 2045/14868* (2013.01); *B29L 2009/00* (2013.01); *B29L 2023/00* (2013.01)

(58) Field of Classification Search
USPC .......................................... 239/119, 337, 601
See application file for complete search history.

(56) References Cited

U.S. PATENT DOCUMENTS

| | | | |
|---|---|---|---|
| 3,858,812 A | 1/1975 | Williams et al. | |
| 4,074,857 A * | 2/1978 | Calder ................. | B05B 1/28 239/119 |
| 4,157,163 A | 6/1979 | Pinto et al. | |
| 4,484,707 A | 11/1984 | Calder | |
| 4,508,268 A | 4/1985 | Geberth, Jr. | |
| 4,635,850 A | 1/1987 | Leisi | |
| 4,828,182 A | 5/1989 | Haruch | |
| 5,294,053 A | 3/1994 | Perret, Jr. | |
| 5,505,381 A * | 4/1996 | Torntore ............. | B05B 15/0283 239/119 |
| 5,749,528 A | 5/1998 | Carey et al. | |
| 5,765,753 A * | 6/1998 | Kieffer ................ | B05B 15/0283 239/119 |
| 5,887,793 A | 3/1999 | Kleffer | |
| 5,893,522 A | 4/1999 | Kieffer | |
| 6,264,115 B1 * | 7/2001 | Liska .................. | B05B 15/0283 239/119 |
| 6,390,386 B2 | 5/2002 | Krohn et al. | |
| 6,502,763 B1 | 1/2003 | McCann | |
| 6,655,606 B2 | 12/2003 | Earl | |
| 6,702,198 B2 | 3/2004 | Tam et al. | |
| 8,814,070 B2 | 8/2014 | Drozd et al. | |
| 2004/0195354 A1* | 10/2004 | Leisi .................... | B05B 1/16 239/119 |
| 2012/0043399 A1 | 2/2012 | Fortier et al. | |

OTHER PUBLICATIONS

International Preliminary Report on Patentability for PCT Application No. PCT/US2014/055804, dated Mar. 31, 2016, 10 pages.

* cited by examiner

US 9,675,982 B2

SPRAY TIP AND METHOD OF MANUFACTURE

CROSS-REFERENCE TO RELATED APPLICATION(S)

This application is a continuation of U.S. application Ser. No. 15/022,044 filed Mar. 15, 2016 for "Spray Tip and Method of Manufacture" by S. Becker, D. Olson, C. Wojciechowski, D. Thompson, which in turn claims the benefit of PCT Application No. PCT/US2014/055804 filed Sep. 16, 2014, which in turns claims the benefit of U.S. Provisional Application Nos. 61/878,191 filed Sep. 16, 2013; 61/929,403 filed Jan. 20, 2014; and 61/987,654 filed May 2, 2014.

BACKGROUND

The present invention relates generally to fluid spraying systems. More particularly, the invention relates to a spray tip used to define a spray pattern at a sprayer nozzle, and a method for making the spray tip.

Fluid spraying systems are commonly used in a wide variety of applications, from industrial assembly to home painting. Handheld sprayers can be used by a human operator, while automated sprayers are typically used in mechanized manufacturing processes. Fluid sprayed by such systems conforms to a spray pattern defined, in large part, by aperture shape and size. In some cases, spray patterns may exhibit non-uniformity in the form of fringes or tails where more spray fluid is deposited, typically at or near the edges of spray patterns. Such defects can often be reduced or eliminated by increasing spray pressure, at the cost of requiring increased power and more structurally solid components, and producing overspray (undesirable fine spray particles that do not land on the desired substrate to be coated).

SUMMARY

In a first embodiment, a spray tip comprises a tip body, a tip piece, and a pre-orifice piece. The tip body has a fluid channel along a channel axis. The tip piece is disposed within the fluid channel, and has a stepped, narrowing passage that terminates in an outlet orifice. The pre-orifice piece has an inlet passage, and is disposed within the fluid channel, abutting and immediately upstream of the tip piece. The pre-orifice piece and the tip piece together define a turbulating chamber therebetween.

In a second embodiment, a spray device includes a pressurized source of spray fluid, a nozzle disposed to spray the spray fluid, and a spray tip disposed in the nozzle to define a spray pattern. The spray tip includes a tip piece with an outlet aperture, a pre-orifice piece with an inlet aperture, and a tip body injection-molded about the tip piece and the pre-orifice piece. The pre-orifice piece is disposed upstream of the tip piece, and the tip body has a fluid channel disposed to carry the spray fluid to the pre-orifice piece.

In a third embodiment, a method of manufacture for a spray tip includes fabricating a tip piece with an outlet orifice, fabricating a pre-orifice piece with an inlet orifice, clamping the tip piece and the pre-orifice piece together in an engaged position, and injection-molding a tip body about the tip piece and the pre-orifice piece, such that the tip body includes a fluid channel to the inlet orifice along a channel axis, and an outlet opening at the outlet orifice along the channel axis.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

The present invention relates to a spray tip with a turbulating tip piece and pre-orifice piece locked within an overmolded tip body. The tip piece and pre-orifice piece cooperate to form a turbulating chamber therebetween, and the tip piece includes a turbulating stepped pattern converging towards an outlet aperture. The overmolded tip body captures the tip piece and pre-orifice piece without the need for additional retainers or anchoring parts or seals.

Figure 1:
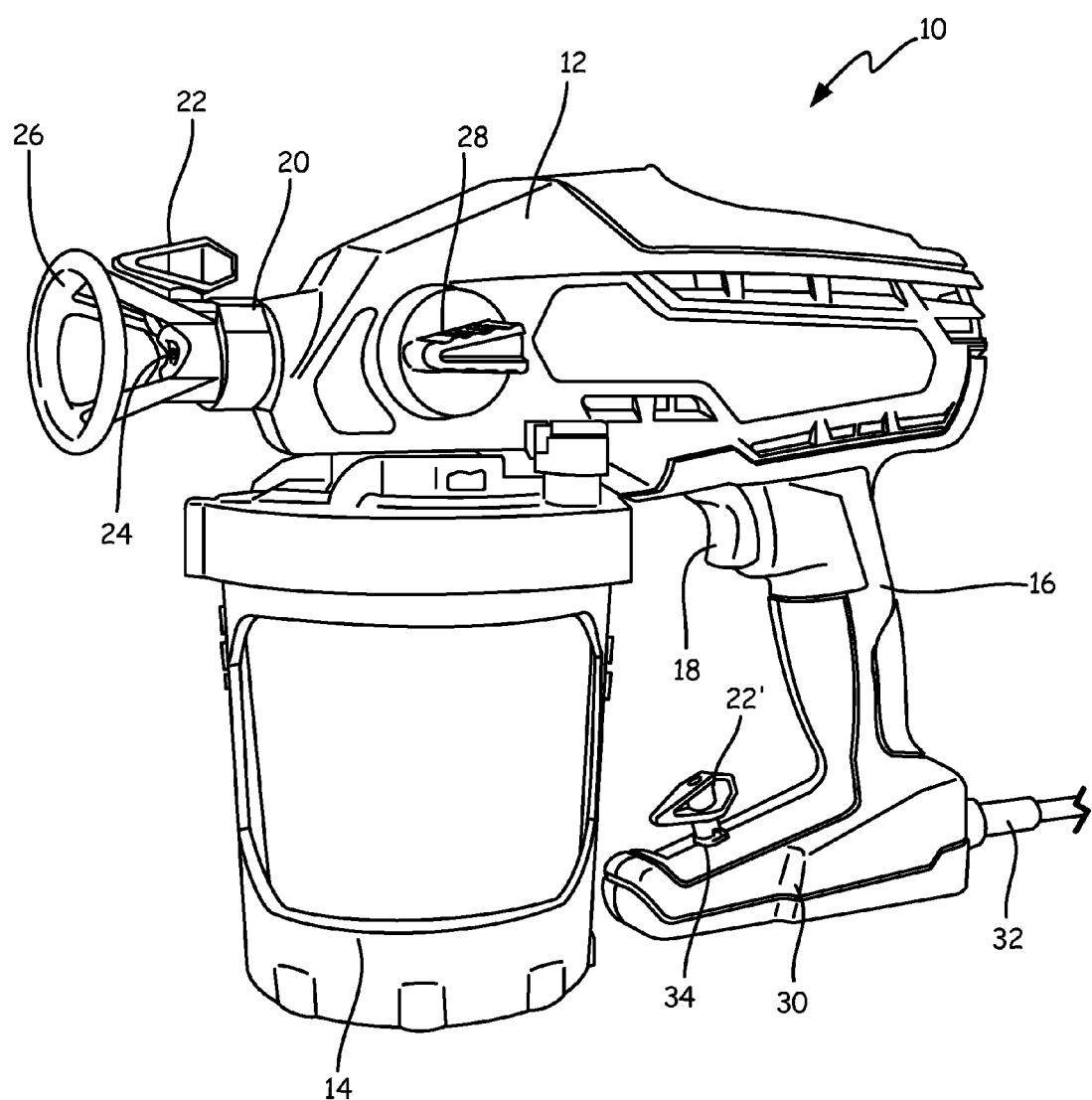
FIG. 1 is a perspective view of fluid sprayer.

FIG. 1 is a perspective view of sprayer 10, a handheld fluid sprayer according to one embodiment of the present invention. Sprayer 10 includes body 12, source 14, grip 16, trigger 18, nozzle 20, spray tips 22 (with outlet aperture 24) and 22', guard 26, prime valve 28, base 30, power cord 32, and storage slot 34. In the depicted embodiment, sprayer 10 can, for example, be an electrical spray device for use with paint, solvent, or other fluids. Although sprayer 10 is illustrated as a hand-held device, stationary or machine-driven sprayers can also utilize the spray tip of the present invention.

Body 12 of sprayer 10 includes pumping elements suitable to drive fluid from source 14 towards nozzle 20, and expel fluid from outlet aperture 24 of spray tip 22. In the depicted embodiment, body 12 can, for example, include electric motorized pumping elements that receive power through power cord 32. In alternative embodiments, body 12 can include pumps powered by a battery (not shown). Grip 16 provides a hand-hold for a human user. When the user depresses trigger 18, sprayer 10 draws fluid from source 14 through body 12, and expels this fluid through nozzle 20. Trigger 18 can, for example, actuate electric or pneumatic pumps within body 12. Although source 14 is depicted as a substantially cylindrical fluid receptacle carried by body 12, alternative embodiments of source 14 can include receptacles of other shapes and sizes, as well as fluid lines or hoses connectable to external fluid supplies. Source 14 can, for example, be a disposable paint container such as a deflating bag. Prime valve 28 can be used to prime pumping elements within body 12 prior to spraying fluid from source 14.

Nozzle 20 houses spray tip 22. Spray tip 22 can, for example, be a removable element with a substantially cylindrical portion insertable into nozzle 20 to provide a desired spray pattern, as depicted and described in further detail below with respect to FIG. 2. Spray tip 22 includes outlet aperture 24, a ground or otherwise machined narrow aperture that atomizes spray fluid and defines a spray pattern. Sprayer 10 can accept various spray tips 22, e.g. spray tips 22 and 22' with different outlet apertures 24 capable of producing different spray patterns suitable for different applications. For example, a spray tip 22 that produces a wide spray pattern can be swapped out for a spray tip 22' that produces a narrow spray pattern when precision spraying is required. In the depicted embodiment, base 30 provides attachment point for power cord 32, and houses storage slot 34 for one such reserve or alternate spray tip 22'. Nozzle 20 is protected by guard 26, a rigid or semi-rigid positioning element. In the depicted embodiment, guard 26 is an elliptical frame situated forward of spray tip 22.

Figure 2:
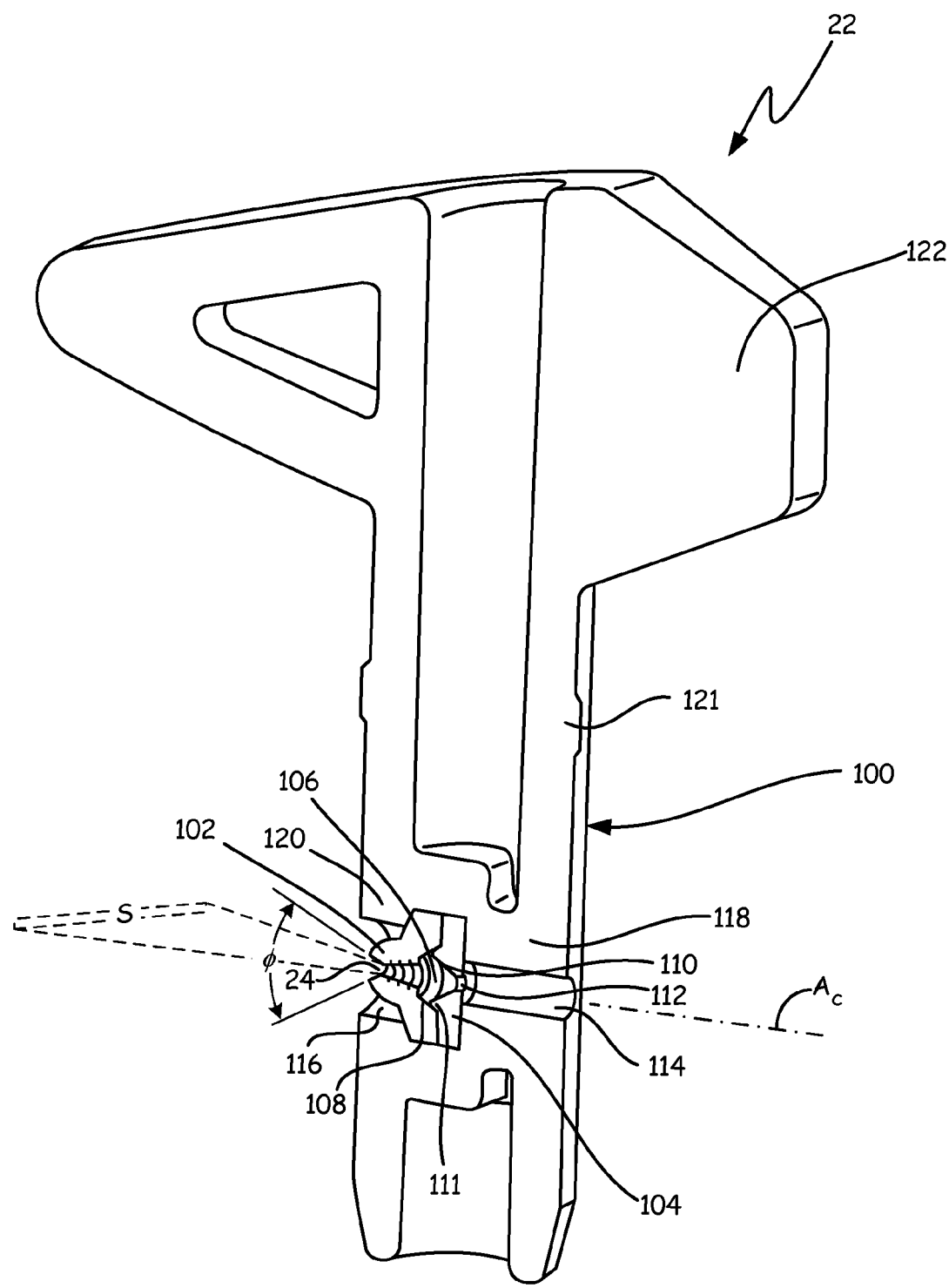
FIG. 2 is a cross-sectional perspective view of a fluid spray tip.
Figure 3A:
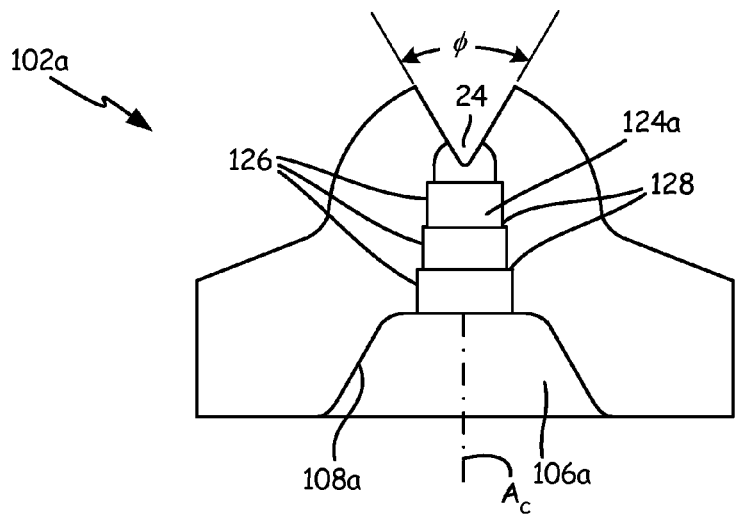
FIGS. 3a, 3b, and 3c are cross-sectional views of different embodiments of a tip piece of the fluid spray tip.
Figure 3B:
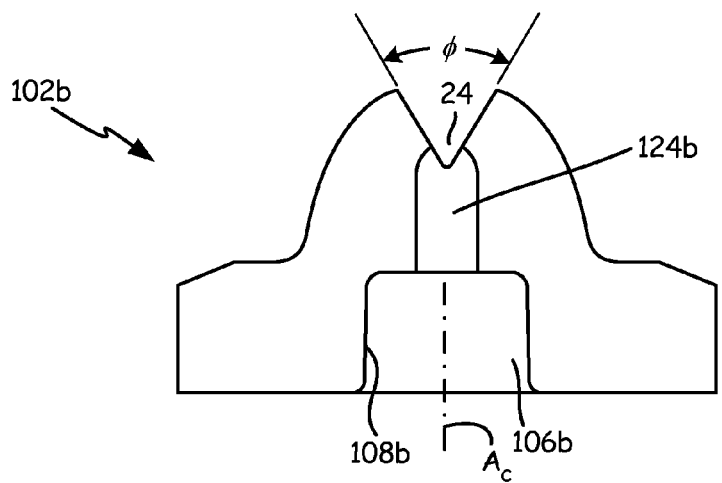
Figure 3C:
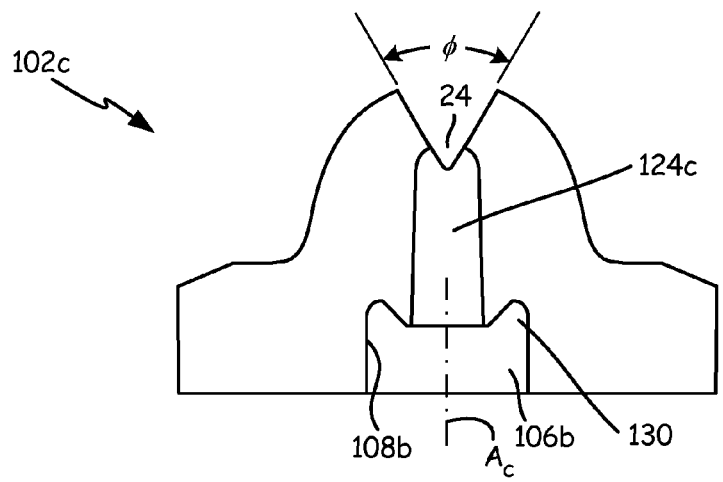
Figure 4:
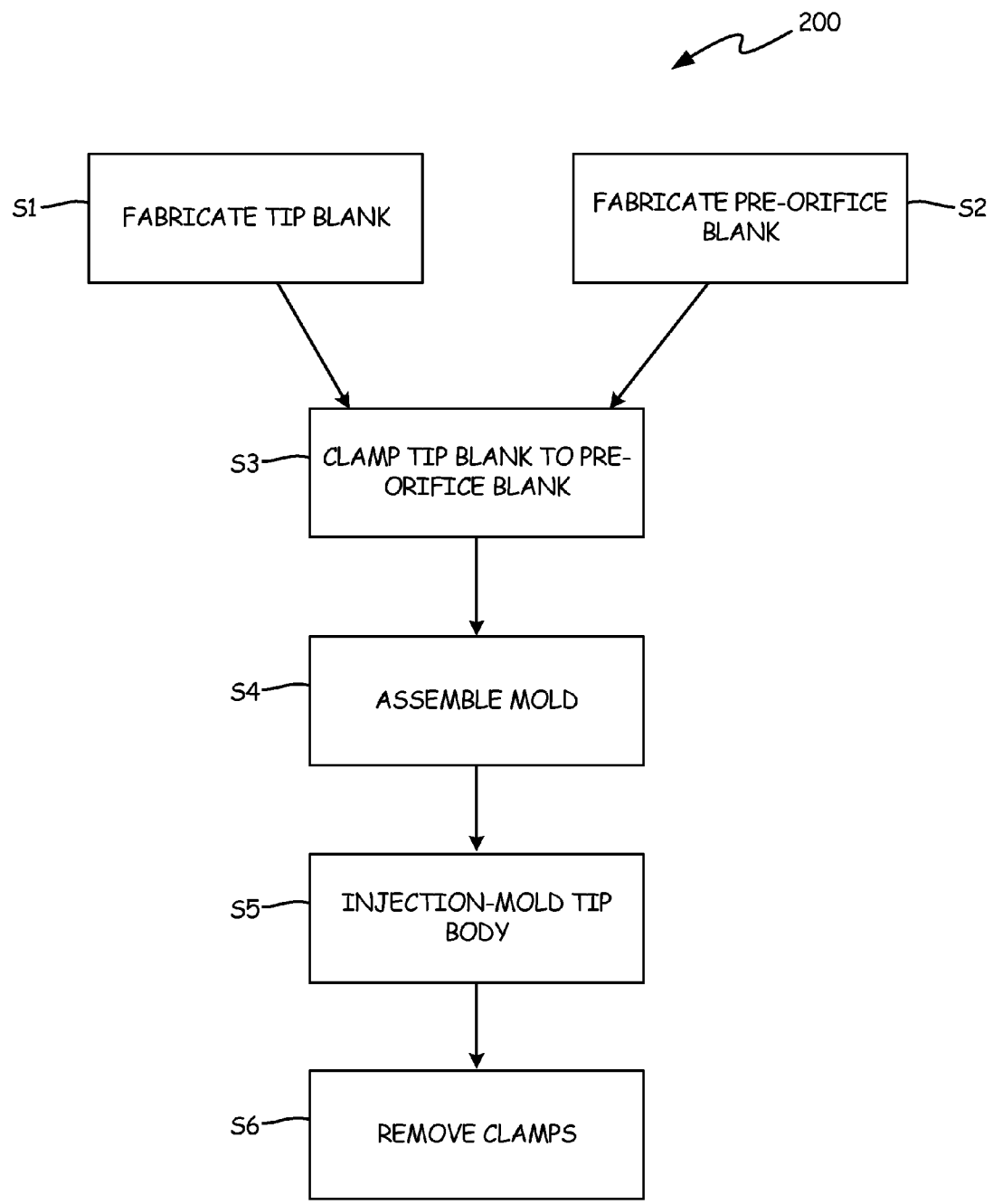
FIG. 4 is a method flowchart illustrating a method of manufacture of the fluid spray tip.

FIG. 2 a cross-sectional perspective view of spray tip 22. Spray tip 22 includes tip body 100, tip piece 102, and pre-orifice piece 104. Tip piece 102 and pre-orifice piece 104 include chamber surfaces 108 and 110, respectively, which collectively define turbulating chamber 106. Tip piece 102 further includes outlet aperture 24, as described above, and pre-orifice piece 104 further includes lip 111 and inlet passage 112. Tip body 100 includes fluid channel 114 disposed along channel axis $A_C$, outlet opening 116 also disposed along channel axis $A_C$, rear block 118, front block 120, bayonet 121, and tab 122.

Outlet aperture 24 has grind angle φ, and produces spray pattern S. As described above with respect to FIG. 1, spray tip 22 can, for example, be a removable component that can be swapped out depending on desired spray pattern. To this end, tab 122 provides a grip point to facilitate inserting spray tip 22 into nozzle 20 (see FIG. 1). In some embodiments, tab 122 can facilitate twisting or locking spray tip 22 into place with bayonet 121, which can for example engage internal grooves (not shown) of guard 26.

In the illustrated embodiment, tip body 100 defines fluid channel 114, an axial passage oriented along channel axis $A_C$. Fluid channel 114 carries working fluid from source 14 to pre-orifice piece 104. Chamber surfaces 108 and 110 of tip piece 102 and pre-orifice piece 104, respectively, define boundaries of turbulating chamber 106. Chamber surface 108 is an upstream surface of tip piece 102, while chamber surface 110 is a downstream surface of pre-orifice piece 104. Fluid from fluid channel 114 enters turbulating chamber 108 through inlet passage 112 of pre-orifice piece. In the depicted embodiment, chamber surfaces 108 and 110 are both substantially conical or frustoconical in shape, and narrow in opposite directions, and turbulating chamber 108 is accordingly a double-conical cavity situated between tip piece 102 and pre-orifice piece 104. In the depicted embodiment, pre-orifice piece 104 includes lip 111, an annular ridge that directs fluid flow along chamber surface 110 and aligns pre-orifice piece 104 with tip piece 102 during assembly.

Inlet passage 112 is a narrow opening or aperture in pre-orifice piece 104 that constricts flow. Inlet passage 112 and turbulating chamber 108 increase working fluid turbulence, reducing net pressure losses across outlet aperture 24 and thereby improving the uniformity of spray pattern S. In some embodiments, this increased working fluid turbulence can facilitate reducing or eliminating undesirable "tails" (high concentration fringes) in spray pattern S. Reduced pressure loss across outlet aperture 24 also allows sprayer 10 to function at lower pressures, reducing power and structural requirements. In some embodiments tip piece 102 can include further turbulating features, as described in greater detail below with respect to FIGS. 3a, 3b, and 3c.

Tip piece 102 and pre-orifice piece 104 are held securely along chamber axis $A_C$ within tip body 100. Tip body includes rear block 118 and front block 120 disposed axially upstream and downstream, respectively, of pre-orifice piece 104 and tip piece 102. Rear block 118 and front block 120 capture tip piece 102 and pre-orifice piece 104 axially, preventing tip piece 102 and/or pre-orifice piece 104 from escaping tip body 100, e.g. under spray pressure. Rear block 118 and front block 120 can, for example, be formed when tip body 100 is injection molded (see FIGS. 4 and 5, and accompanying description) by overmolding tip body 100 about tip piece 102 and pre-orifice piece 104, thereby creating a fit that restrains axial (forward or aft) and radial movement relative to tip body 100. In at least some embodiments, tip body 100 directly contacts tip piece 102 and pre-orifice piece 104 with no intervening elements.

Outlet aperture 24 of tip piece 102 defines spray pattern S with spray angle ϕ. Tip body 100 includes outlet opening 116 about outlet aperture 24, sized to prevent fouling and avoid obstructing spray pattern S by leaving tip piece 102 exposed around outlet aperture 24.

FIGS. 3*a*, 3*b*, and 3*c* are cross-sectional views of three further (or alternative) embodiments of tip piece 102, labeled tip pieces 102*a*, 102*b*, and 102*c*, respectively. All three tip piece embodiments include outlet aperture 24 with grind angle ϕ suited to produce spray pattern S. Outlet aperture 24 can, for example, be a diverging opening such as a ground wedge or angle cut into a downstream wall of tip pieces 102*a*, 102*b*, and 102*c*. All three tip piece embodiments also include some form of turbulating chamber 106, chamber surface 108, and outlet passage 124.

Tip piece 102*a* of FIG. 3*a* illustrates outlet passage 124*a*, which is comprised of a plurality of cylindrical sections 126 with steps 128 converging (i.e. decreasing in diameter) from turbulating chamber 106*a* to outlet orifice 24. Turbulating chamber 106*a* has conical or frustoconical walls with chamber surface 108*a*, as described above with respect to FIG. 2. Cylindrical sections 126 and steps 128 further turbulate fluid flow from turbulating chamber 106 to outlet aperture, reducing pressure loss across outlet orifice 24.

Tip piece 102*b* of FIG. 3*b* illustrates outlet passage 124*b*, a substantially cylindrical channel extending from turbulating chamber 106*b* to outlet orifice 24. Turbulating chamber 106*b* is a substantially cylindrical cavity, chamber surface 108*b* is a substantially annular wall concentrically disposed about channel axis $A_C$.

Tip piece 102*c* of FIG. 3*c* illustrates outlet passage 124*c* and turbulating chamber 106*c*. Like outlet passage 124*b*, outlet passage 124*c* is a substantially cylindrical channel extending from turbulating chamber 106*c* to outlet orifice 24. Turbulating chamber 106*c* is a flared cavity with annular recess 130 to promote fluid turbulence. Although not shown in FIG. 3*b* or 3*c*, some embodiments of tip piece 102 including a substantially cylindrical turbulating chamber 106 can include a stepped outlet passage 124, as illustrated in FIG. 3*a*.

All illustrated embodiments of tip piece 102 (including tip pieces 102*a*, 102*b*, and 102*c*) include a chamber surface 108 that forms one side of turbulating chamber 106. Turbulating chamber 106, outlet passage 124, and the step interface therebetween all promote fluid turbulence, thereby reducing undesirable pressure loss across outlet orifice 24.

FIG. 4 is a flowchart illustrating method 200 for of manufacture for spray tip 22. FIG. 5 is a cross-sectional view of spray tip 100 taken along section line 5-5 of FIG. 2 during manufacture according to method 200. FIG. 5 depicts tip body 100, tip piece 102, and pre-orifice piece 104 of spray tip 22, including outlet opening 116 for outlet orifice 24, and channel 115 to pre-orifice piece 102. FIG. 5 further depicts various manufacturing tools (not shown in FIG. 2), including clamp assembly 300 (with clamp pin 302, clamp tube 304, aperture clamp 306, and biasing springs 308 and 310) and injection mold 312 (with mold sections 314 and 316).

According to method 200, tip piece 102 and pre-orifice piece 104 are first fabricated. (Steps S1 and S2, respectively). Tip piece 102 and pre-orifice piece 104 can, for example, be formed of tungsten carbide or similar rigid, powder-based materials. Tip piece 102 and pre-orifice piece 104 can, for example, be cast into a desired shape and ground or otherwise machined to produce outlet aperture 24.

Figure 5:
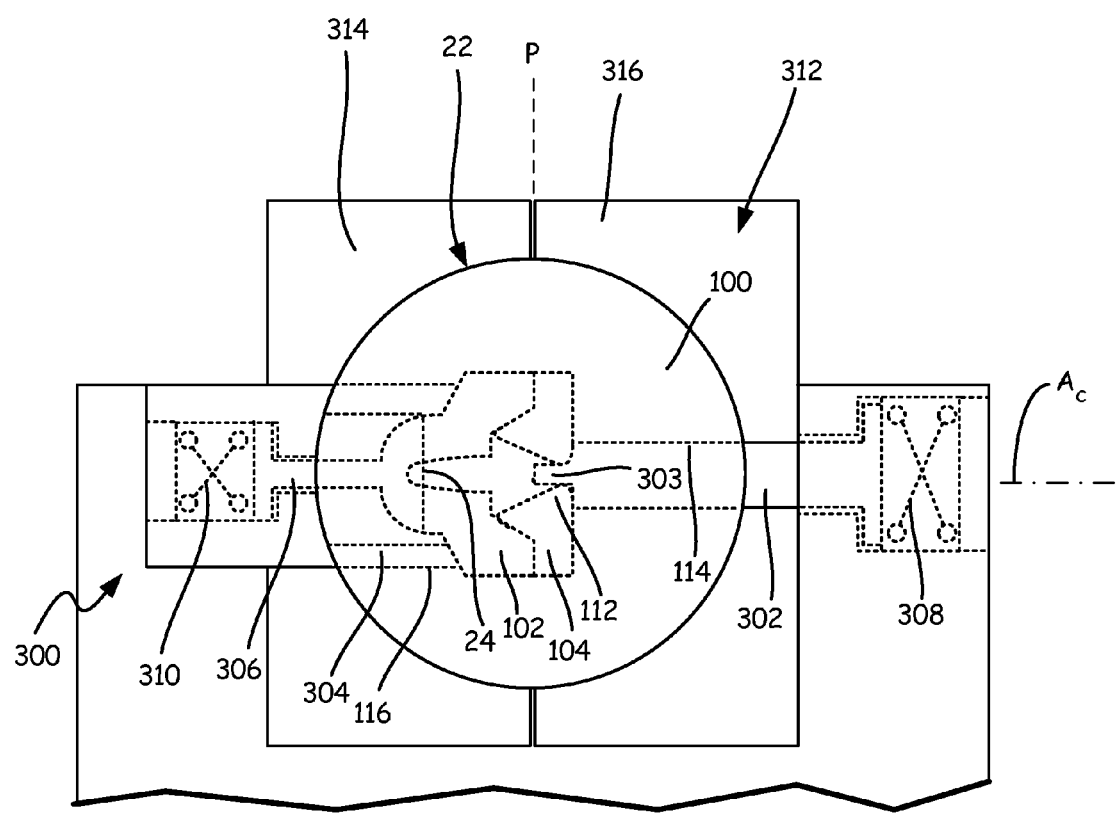
FIG. 5 is a cross-sectional view of the fluid spray tip, during assembly according to the method of FIG. 4.

Next, tip piece 102 and pre-orifice piece 104 are clamped together in an engaged position with clamp assembly 300. (Step S3). In the illustrated embodiment of FIG. 5, clamp pin 302 secures pre-orifice piece 104 from a downstream direction, while clamp tube 304 and aperture clamp 306 secure tip piece 102 from an upstream direction. Clamp pin 302 can be a substantially cylindrical rod biased against pre-orifice piece 104 by biasing spring 308. Clamp pin 302 includes retainer 303, an axial protrusion that fits inside inlet passage 102, allowing clamp pin 302 to position pre-orifice piece 104 laterally as well as axially in alignment with tip piece 102, along channel axis $A_C$. Clamp tube 304 similarly situates and retains tip piece 102 against pre-orifice piece 104, while aperture clamp 306 is biased against tip piece 102 by biasing spring 310 to seal or cover outlet aperture 24 against fluid ingress during manufacture. Alternative configurations of tip piece 102 and pre-aperture blank 104 can necessitate different clamping arrangements for clamp assembly 300.

Once tip piece 102 and pre-orifice piece 104 are clamped in place, injection mold 312 is assembled about tip piece 102 and pre-orifice piece 104. (Step S4). In the depicted embodiment, injection mold 312 is a two-part mold with mold sections 314 and 316. Mold sections 314 and 316 can, for example, be halves of injection mold 312 split along parting line P. In alternative embodiments, injection mold 312 can comprise three or more distinct sections. Once mold sections 314 and 316 are in place, polymer is injected into injection mold 312 to form tip body 100 about blanks 102 and 104, thereby retaining blanks 102 and 104 within tip body 100. (Step S5). In the depicted embodiment, fluid channel 114 is defined within tip body by clamp pin 302, and outlet opening 116 is defined by clamp tube 304. Once tip body 100 has hardened, injection mold 312 is removed, clamping assembly 300 is released, and spray tip 22 is removed from molding tooling. (Step S6). The finished spray tip 22 is then ready for use.

Method 200 provides an inexpensive means of fabricating spray tip 22 by overmolding tip body 100 around tip piece 102 and pre-orifice piece 104. The overmolding of tip body 100 captures blanks 102 and 104 without need for additional retainers or anchoring elements. Tip piece 102 and pre-orifice piece 104 together reduce pressure loss across outlet aperture 24, improving the uniformity of spray pattern S and reducing power and structural requirements of sprayer 10.

Discussion of Possible Embodiments

The following are non-exclusive descriptions of possible embodiments of the present invention.

A spray tip comprising: a tip body with a fluid channel along a channel axis; a tip piece disposed within the fluid channel, and having a stepped, narrowing passage that terminates in an outlet orifice; a pre-orifice piece having an inlet passage, the pre-orifice piece disposed within the fluid channel, abutting and immediately upstream of the tip piece, so as to define a turbulating chamber between the tip piece and the pre-orifice piece.

The spray tip of the preceding paragraph can optionally include, additionally and/or alternatively, any one or more of the following features, configurations and/or additional components:

A further embodiment of the foregoing spray tip, wherein the turbulating chamber is a double-conical chamber formed between a first conical surface of the pre-orifice piece and a second conical surface of the tip piece.

A further embodiment of the foregoing spray tip, wherein the pre-orifice piece includes an annular lip that engages with the first conical surface.

A further embodiment of the foregoing spray tip, wherein the inlet passage and the second conical surface are disposed coaxially about the channel axis.

A further embodiment of the foregoing spray tip, wherein the stepped, narrowing passage comprises a plurality of sequential cylindrical steps disposed coaxially with the channel axis, arranged converging from widest to narrowest at the outlet orifice.

A further embodiment of the foregoing spray tip, wherein the tip body is formed of polymer.

A further embodiment of the foregoing spray tip, wherein the tip piece and the pre-orifice piece are captured along the channel axis on both sides within a cavity of the tip body.

A spray device comprising: a pressurized source of spray fluid; a nozzle disposed to spray the spray fluid; and a spray tip disposed in the nozzle to define a spray pattern, the spray tip comprising: a tip piece with an outlet aperture; a tip body injection-molded about the tip piece, and having a fluid channel disposed to carry the spray fluid to the tip piece The spray device of the preceding paragraph can optionally include, additionally and/or alternatively, any one or more of the following features, configurations and/or additional components:

A further embodiment of the foregoing spray device, wherein the spray tip further comprises a pre-orifice piece disposed upstream of the tip piece, with an inlet aperture disposed to receive fluid from the fluid channel.

A further embodiment of the foregoing spray device, wherein the tip piece and the pre-orifice piece cooperate to form a turbulating chamber therebetween.

A further embodiment of the foregoing spray device, wherein the turbulating chamber has a double-conical shape formed between a first conical surface of the tip piece and a second conical surface of the pre-orifice piece.

A further embodiment of the foregoing spray device, wherein the tip piece has a stepped passage that narrows from the turbulating chamber to the outlet aperture.'

A further embodiment of the foregoing spray device, wherein the outlet aperture defines a spray pattern.

A spray tip comprising: a tip body with a fluid channel along a channel axis; and a tip piece disposed within the fluid channel, and having a stepped, narrowing outlet passage comprising a plurality of sequential cylindrical steps disposed coaxially with the channel axis, arranged converging from widest at an upstream end to narrowest at an outlet orifice.

The spray tip of the preceding paragraph can optionally include, additionally and/or alternatively, any one or more of the following features, configurations and/or additional components:

A further embodiment of the foregoing spray tip, wherein the tip piece is formed of tungsten carbide.

A further embodiment of the foregoing spray tip, further comprising a pre-orifice piece disposed upstream of the tip piece, with an inlet aperture disposed to receive fluid from the fluid channel.

A further embodiment of the foregoing spray tip, wherein the tip piece and the pre-orifice piece cooperate to form a turbulating chamber therebetween.

A method of manufacture for a spray tip, the method comprising: fabricating a tip piece with an outlet orifice; fabricating a pre-orifice piece with an inlet orifice; clamping the tip piece and the pre-orifice piece together in an engaged position; injection-molding a tip body about the tip piece, such that the tip body includes a fluid channel to the inlet orifice along a channel axis, and an outlet opening at the outlet orifice along the channel axis The method of the preceding paragraph can optionally include, additionally and/or alternatively, any one or more of the following features, configurations and/or additional components:

A further embodiment of the foregoing method, wherein injection-molding the tip body comprises overmolding the tip body about the clamped tip piece and pre-orifice piece such that the tip body restrains the tip piece and pre-orifice piece against movement within the tip body.

A further embodiment of the foregoing method, further comprising unclamping the tip piece and the pre-orifice piece after injection-molding the tip body.

A further embodiment of the foregoing method, wherein clamping the tip piece and the pre-orifice piece together in an engaged position involves securing and aligning the pre-orifice piece along the channel axis with a clamp pin, and securing and aligning the tip piece along the channel axis with a clamp tube.

A further embodiment of the foregoing method, wherein the clamp pin defines the fluid channel for the injection molding, and the clamp tube defines the outlet opening for the injection molding.

A further embodiment of the foregoing method, wherein fabricating at least one of the tip piece and the pre-orifice piece comprises grinding tungsten carbide base material.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray tip for atomizing a fluid in a spray, the spray tip comprising:
    a tip body, the tip body having a cylindrical portion having an exterior circumference, the cylindrical portion having an aperture that extends through the cylindrical portion, the aperture having a pair of openings respectively located on opposite sides of the exterior circumference, wherein the fluid moves through the aperture in an upstream to downstream orientation;
    a pre-orifice piece located in the aperture of the tip body, the pre-orifice piece having an inlet passage and a chamber section, the inlet passage located upstream of the chamber section, the inlet passage is narrower than the chamber section; and
    a tip piece located in the aperture of the tip body downstream of the pre-orifice piece and abutting the pre-orifice piece, the tip piece having a stepped section and an outlet aperture, the outlet aperture downstream of the stepped section, the outlet aperture is narrower than the stepped section, the stepped section comprising a plurality of cylindrical steps, the plurality of cylindrical steps arranged sequentially converging from widest upstream and narrowing downstream toward the outlet aperture,
    wherein the pre-orifice and the tip piece together form a turbulating chamber that is located between the inlet passage and the outlet aperture and the fluid flows through each of the inlet passage, the chamber section, and the stepped section before being released through the outlet aperture as the spray, and
    wherein the tip piece and the pre-orifice piece fully define the turbulating chamber, the chamber section of the pre-orifice piece has an upstream frustoconical surface that widens in a downstream direction and that defines an upstream portion of the turbulating chamber, and the tip piece has a downstream frustoconical surface of the turbulating chamber that narrows in the downstream direction and that defines a downstream portion of the turbulating chamber.

2. The spray tip of claim 1, wherein the plurality of cylindrical steps comprises three coaxial cylindrical passages that sequentially decrease in diameter.

3. The spray tip of claim 2, wherein the narrowest cylindrical passage terminates at the outlet aperture.

4. The spray tip of claim 1, wherein the inlet passage is the narrowest passage within the aperture that is upstream of the tip piece.

5. The spray tip of claim 1, wherein the downstream frustoconical surface of the tip piece is located upstream of the stepped section.

6. The spray tip of claim 1, wherein the tip piece is formed from tungsten carbide.

7. The spray tip of claim 1, wherein the cylindrical portion of the tip body is configured to be inserted into a nozzle of a spray device, rotated within the nozzle, and removed from the nozzle.

8. The spray tip of claim 1, further comprising a bayonet on an exterior surface of the tip body.

9. The spray tip of claim 1, wherein an interior surface of the cylindrical portion that defines the aperture contacts each of the pre-orifice piece and the tip piece with no intervening elements therebetween.

10. The spray tip of claim 1, wherein the turbulating chamber has an inner diameter that is greater than inner diameters of the inlet passage and the outlet aperture.

11. The spray tip of claim 1, wherein the cylindrical portion of the tip body comprises a front block disposed axially downstream of the tip piece, the front block defining a narrowed portion of the aperture which prevents the tip piece from moving downstream along the aperture.

12. The spray tip of claim 1, wherein the cylindrical portion of the tip body is formed as a unitary portion of a material, and the unitary portion of the material defines the aperture.

13. The spray tip of claim 12, wherein the material is a polymer that is overmolded on the pre-orifice piece and the tip piece.

14. The spray tip of claim 1, further comprising a pair of tabs that are attached to the tip body and project from the tip body in opposite directions.

15. The spray tip of claim 1, wherein the pre-orifice piece extends into the tip piece.

16. A spray tip for atomizing a fluid in a spray, the spray tip comprising:
- a tip body, the tip body having a cylindrical portion having an exterior circumference, the cylindrical portion having an aperture that extends through the cylindrical portion, the aperture having a pair of openings respectively located on opposite sides of the exterior circumference, wherein the fluid moves through the aperture in an upstream to downstream orientation;
- a pre-orifice piece located in the aperture of the tip body, the pre-orifice piece having an inlet passage and a chamber section, the inlet passage located upstream of the chamber section, the inlet passage is narrower than the chamber section, the chamber section of the pre-orifice piece having an upstream frustoconical surface that widens in the downstream direction; and
- a tip piece located in the aperture of the tip body downstream of the pre-orifice piece and abutting the pre-orifice piece, the tip piece having a chamber section, a stepped section, and an outlet aperture, the chamber section of the tip piece upstream of the stepped section, the chamber section of the tip piece having a downstream frustoconical surface that narrows in the downstream direction, the stepped section comprising three cylindrical passages that are situated downstream from the downstream frustoconical surface, and that sequentially decrease in diameter converging from widest in the upstream direction and narrowing in the downstream direction, the outlet aperture downstream of the stepped section, the outlet aperture narrower than the chamber section of the tip piece,
- wherein an interior surface of the cylindrical portion that defines the aperture contacts each of the pre-orifice piece and the tip piece, the upstream frustoconical surface of the pre-orifice and the downstream frustoconical surface of the tip piece together form a double-conical turbulating chamber, and the fluid flows through each of the inlet passage, the turbulating chamber, and the stepped section before being released through the outlet aperture as the spray.

17. A spray tip for atomizing fluid in a spray, the spray tip comprising:
- a tip body, the tip body having a cylindrical portion that is elongated along a body axis, the tip body having an aperture that extends through the cylindrical portion along a channel axis that is transverse to the body axis, the channel axis oriented along opposite upstream and downstream directions;
- a pre-orifice piece located in the aperture of the tip body, the pre-orifice piece having an inlet passage and an upstream chamber section, wherein the inlet passage is coaxial with the channel axis and located upstream of the upstream chamber section, the inlet passage is narrower than the upstream chamber section; and
- a tip piece located in the aperture of the tip body downstream of and abutting the pre-orifice piece, the tip piece having a stepped section and an outlet aperture, the outlet aperture located downstream of the stepped section and along the channel axis, the stepped section comprising three cylindrical passages that are disposed coaxially with the channel axis and that sequentially decrease in diameter converging from widest in the upstream direction and narrowing in the downstream direction,
- wherein the pre-orifice and the tip piece together form a turbulating chamber that is located between the inlet passage and the outlet aperture, and the fluid flows in order through each of the inlet passage, the turbulating chamber, and the stepped section before being released through the outlet aperture as the spray; and
- wherein the tip piece and the pre-orifice piece fully define the turbulating chamber, with the upstream chamber section of the pre-orifice piece having an upstream frustoconical surface that widens in a downstream direction to form an upstream portion of the turbulating chamber, and with the tip piece having a downstream frustoconical surface that narrows in the downstream direction to form a downstream portion of the turbulating chamber.

* * * * *

UNITED STATES PATENT AND TRADEMARK OFFICE
CERTIFICATE OF CORRECTION

| | | |
|---|---|---|
| PATENT NO. | : 9,675,982 B2 | Page 1 of 1 |
| APPLICATION NO. | : 15/362047 | |
| DATED | : June 13, 2017 | |
| INVENTOR(S) | : Steven Dale Becker et al. | |

It is certified that error appears in the above-identified patent and that said Letters Patent is hereby corrected as shown below:

In the Claims

Column 8, Line 61, Claim 10:
Delete "than inner"
Insert --than the inner--

Signed and Sealed this
Tenth Day of October, 2017

Joseph Matal
*Performing the Functions and Duties of the*
*Under Secretary of Commerce for Intellectual Property and*
*Director of the United States Patent and Trademark Office*